US009653967B2

(12) United States Patent
Maynez (10) Patent No.: US 9,653,967 B2
(45) Date of Patent: May 16, 2017

(54) COOLING ARRANGEMENT FOR AN ELECTRIC MOTOR

(71) Applicant: Techtronic Power Tools Technology Limited, Tortola (VG)

(72) Inventor: Rafael Maynez, Anderson, SC (US)

(73) Assignee: TECHTRONIC POWER TOOLS TECHNOLOGY LIMITED, Tortola (VG)

( * ) Notice: Subject to any disclaimer, the term of this patent is extended or adjusted under 35 U.S.C. 154(b) by 849 days.

(21) Appl. No.: 13/835,071

(22) Filed: Mar. 15, 2013

(65) Prior Publication Data

US 2014/0265665 A1    Sep. 18, 2014

(51) Int. Cl.
*H02K 1/32* (2006.01)
*H02K 9/06* (2006.01)
(Continued)

(52) U.S. Cl.
CPC .......... *H02K 9/06* (2013.01); *H02K 1/26* (2013.01); *H02K 1/28* (2013.01); *H02K 1/32* (2013.01); *H02K 13/04* (2013.01)

(58) Field of Classification Search
CPC   H02K 1/26; H02K 1/32; H02K 1/325; H02K 9/02; H02K 9/04; H02K 9/06
(Continued)

(56) References Cited

U.S. PATENT DOCUMENTS 422,681 A * 3/1890 Wray ............... H02K 15/02
310/267
532,795 A * 1/1895 Lemp ............... H02K 15/12
310/216.011
(Continued)

FOREIGN PATENT DOCUMENTS

CH         660263 A5 *  3/1987  ............. H02K 1/32
CN       2184287        11/1994
(Continued)

OTHER PUBLICATIONS

Meyer et al., Machine Translation of CH660263, Mar. 1987.*
(Continued)

*Primary Examiner* — Tran Nguyen
*Assistant Examiner* — Eric Johnson
(74) *Attorney, Agent, or Firm* — Michael Best & Friedrich LLP (57) ABSTRACT

An electric motor includes a stator operable to produce a magnetic field and defining an opening, and a rotor at least partially disposed within the opening. The rotor includes a shaft extending along a rotational axis, a first rotor magnetic core portion including a plurality of laminations stacked contiguously on the shaft, and a second rotor magnetic core portion coupled to the plurality of laminations. The first rotor magnetic core portion and the second rotor magnetic core portion cooperate to define the rotor magnetic core. A plurality of windings is coupled to the rotor magnetic core and an air flow path is formed as part of the second rotor magnetic core portion. The air flow path includes an axial portion that passes through the shaft axially along the rotational axis and a radial portion that extends radially outward through the second rotor magnetic core portion.

13 Claims, 10 Drawing Sheets

(51) Int. Cl.
   *H02K 1/26* (2006.01)
   *H02K 1/28* (2006.01)
   *H02K 13/04* (2006.01)

(58) Field of Classification Search
   USPC ... 310/60 A, 61, 216.016–216.018, 216.048,
      310/216.067, 216.109, 216.015
   See application file for complete search history.

(56) References Cited

U.S. PATENT DOCUMENTS

| | | | |
|---|---|---|---|
| 752,168 A * | 2/1904 | Holzwarth | H02K 9/06 |
| | | | 310/58 |
| 1,980,698 A * | 11/1934 | Reardon | H02K 1/26 |
| | | | 310/211 |
| 2,773,203 A | 12/1956 | Opel et al. | |
| 3,558,943 A | 1/1971 | Nilsson | |
| 3,997,803 A * | 12/1976 | Mishra | H02K 1/32 |
| | | | 310/59 |
| 4,053,801 A | 10/1977 | Ray et al. | |
| 4,800,315 A | 1/1989 | Schulz et al. | |
| 5,019,733 A | 5/1991 | Kano et al. | |
| 5,130,585 A | 7/1992 | Iwamatsu et al. | |
| 5,162,683 A * | 11/1992 | Isozumi | F02N 11/00 |
| | | | 29/598 |
| 5,365,132 A | 11/1994 | Hann et al. | |
| 5,578,878 A * | 11/1996 | Hall | H02K 7/04 |
| | | | 310/193 |
| 5,596,799 A * | 1/1997 | Beakes | H02K 7/04 |
| | | | 198/394 |
| 6,011,331 A | 1/2000 | Gierer et al. | |
| 6,570,276 B1 | 5/2003 | Morel et al. | |
| 6,727,609 B2 * | 4/2004 | Johnsen | H02K 1/32 |
| | | | 310/52 |
| 6,815,849 B2 | 11/2004 | Serizawa et al. | |
| 6,940,192 B2 | 9/2005 | Katsuzawa et al. | |
| 6,982,506 B1 | 1/2006 | Johnsen | |
| 7,285,891 B2 * | 10/2007 | Yamamoto | H02K 1/148 |
| | | | 310/216.067 |
| 7,327,055 B2 | 2/2008 | Devine | |
| 7,411,323 B2 | 8/2008 | Pfannscmidt et al. | |
| 7,646,118 B2 | 1/2010 | Yoshida et al. | |
| 7,646,119 B2 | 1/2010 | Schmidt | |
| 7,696,663 B2 | 4/2010 | Schmohl et al. | |
| 7,732,954 B2 | 6/2010 | Wiker et al. | |
| 2003/0030333 A1 * | 2/2003 | Johnsen | H02K 1/32 |
| | | | 310/54 |
| 2004/0036367 A1 | 2/2004 | Denton et al. | |
| 2007/0120428 A1 | 5/2007 | Pfannscmidt | |
| 2007/0273221 A1 | 11/2007 | Kinoshite et al. | |
| 2008/0020696 A1 | 1/2008 | Van Gansen | |
| 2008/0106159 A1 | 5/2008 | Yoshida et al. | |
| 2010/0026112 A1 | 2/2010 | Li et al. | |

FOREIGN PATENT DOCUMENTS

| | | |
|---|---|---|
| JP | S60035928 | 2/1985 |
| JP | H02299436 | 12/1990 |
| JP | 11089146 A * | 3/1999 |

OTHER PUBLICATIONS

Tagashira, Machine Translation of JP11089146, Mar. 1999.*
United States Patent Office Action for U.S. Appl. No. 14/561,749 dated Mar. 20, 2017 (21 pages).

* cited by examiner

COOLING ARRANGEMENT FOR AN ELECTRIC MOTOR

BACKGROUND

The present invention relates to a cooling arrangement for an electric motor. More specifically, the present invention relates to a cooling arrangement for the rotor of an electric motor.

Known cooling methods for electric motors often result in uneven temperature distributions within the motors. Known methods typically cool the exterior of the motor using cooling air generated by a fan. However, the highest temperature usually occurs at the center of the rotor where cooling air is less effective.

SUMMARY

In one construction, the invention provides an electric motor that includes a stator operable to produce a magnetic field and defining an opening, and a rotor at least partially disposed within the opening. The rotor includes a shaft extending along a rotational axis, a first rotor magnetic core portion including a plurality of laminations stacked contiguously on the shaft, and a second rotor magnetic core portion coupled to the plurality of laminations. The first rotor magnetic core portion and the second rotor magnetic core portion cooperate to define a rotor magnetic core. A plurality of windings is coupled to the rotor magnetic core and an air flow path is formed as part of the second rotor magnetic core portion. The air flow path includes an axial portion that passes through the shaft axially along the rotational axis and a radial portion that extends radially outward through the second rotor magnetic core portion.

In another construction, the invention provides an electric motor that includes a shaft extending along a rotational axis and having a first end and a second end. A first plurality of laminations is coupled to the shaft and stacked along the rotational axis, each of the first plurality of laminations having a first cross-section, a second plurality of laminations is coupled to the shaft and stacked along the rotational axis immediately adjacent the first plurality of laminations, each of the second plurality of laminations having a second cross-section different from the first cross-section, and a third plurality of laminations is coupled to the shaft and stacked along the rotational axis immediately adjacent the second plurality of laminations such that the second plurality of laminations are disposed between the first plurality of laminations and the third plurality of laminations, each of the third plurality of laminations having a third cross-section that is substantially the same as the first cross-section. A plurality of teeth is defined by the cooperation of the first plurality of laminations, the second plurality of laminations, and the third plurality of laminations, each tooth cooperates with an adjacent tooth to define a slot. A plurality of windings are each coupled to at least one of the teeth and disposed in at least two of the slots. An air flow path includes an axial portion that extends along the rotational axis, and a radial portion that extends radially through a gap defined in the second plurality of laminations. The air flow path is operable to direct a flow of air through at least a portion of the plurality of windings.

In yet another construction, the invention provides an electric motor that includes a shaft extending along a rotational axis and having a support end and a free end and a plurality of laminations coupled to the shaft and stacked along the rotational axis adjacent the free end. The plurality of laminations defines a first coupling portion and partially defines a first plurality of teeth. A one-piece magnetic component includes a second coupling portion coupled to the first coupling portion, a support portion, and a core portion. The core portion includes a plurality of full-length teeth that extend a full length of the core portion and a plurality of partial-length teeth that extend along only a portion of the full length of the core portion. The first plurality of teeth, the plurality of full-length teeth, and the plurality of partial-length teeth cooperate to define a plurality of complete teeth with each complete tooth cooperating with an adjacent complete tooth to define a slot. A plurality of windings are each coupled to at least one of the complete teeth and disposed in at least two of the slots. An air flow path is formed as part of the one-piece magnetic component and is operable to direct a flow of air through the support portion and radially through the windings coupled to the partial-length teeth. A first bearing is coupled to the shaft and a second bearing is coupled to the support portion.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising,"

or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

DETAILED DESCRIPTION

Figure 1:
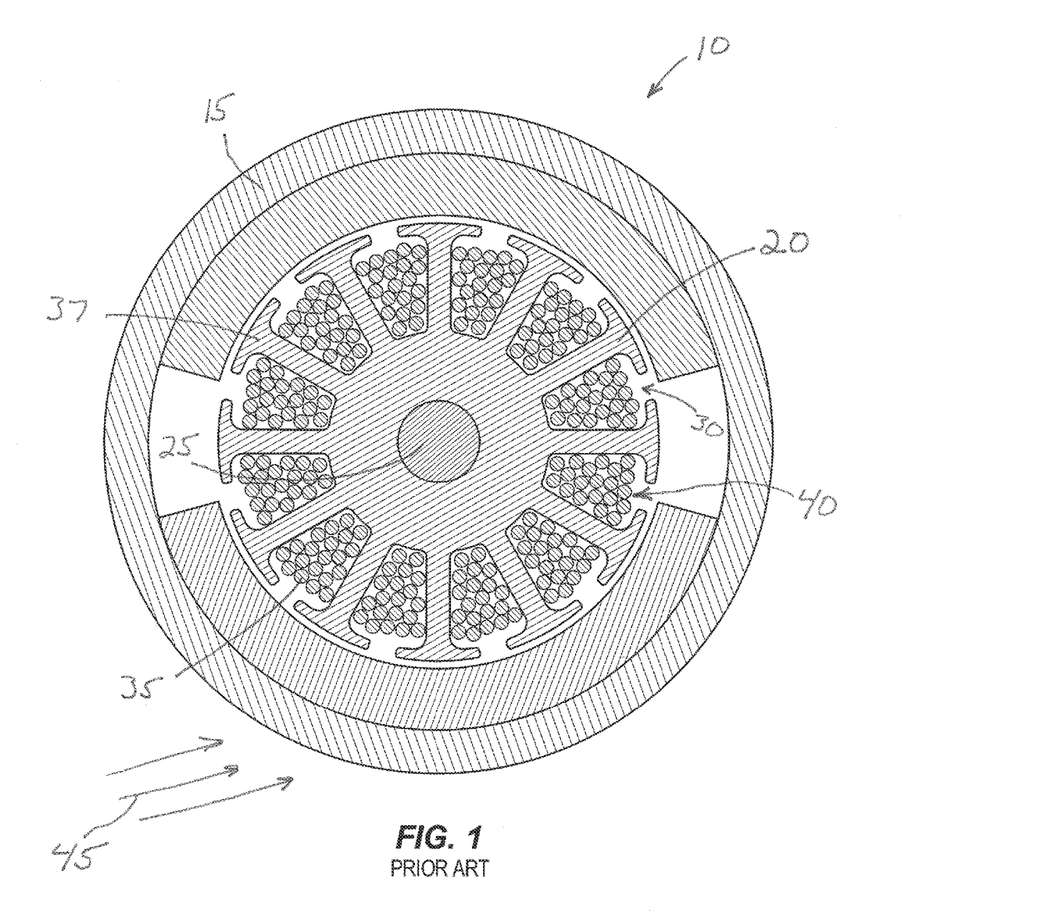
FIG. 1 is a an end section view of a prior art motor illustrating the heat distribution.

FIG. 1 illustrates an end view of a prior electric motor 10. The electric motor 10 includes a substantially cylindrical stator 15 operable to produce a magnetic field. A rotor 20 is supported for rotation with respect to the stator 15 and includes a solid shaft 25. The rotor 20 includes twelve slots 30 that support wires 35 that are wound around teeth 37 to define coils or windings 40 that cooperate with the teeth 37 to define rotor poles. During motor operation, electrical current flows through these windings 40 and produces heat. The heat conducts inward to quickly heat the rotor 20 and the shaft 25 to a high temperature. The heat is also transferred outward to the stator 15 via convection and radiation. Because these heat transfer processes are less efficient and because of the larger surface area of the stator 15, the stator 15 remains cooler than the rotor 20. In addition, cooling air 45 is applied to the exterior of the stator 15 to enhance the heat extraction. Thus, the rotor 20 remains quite hot when compared to the stator 15.

Figure 2:
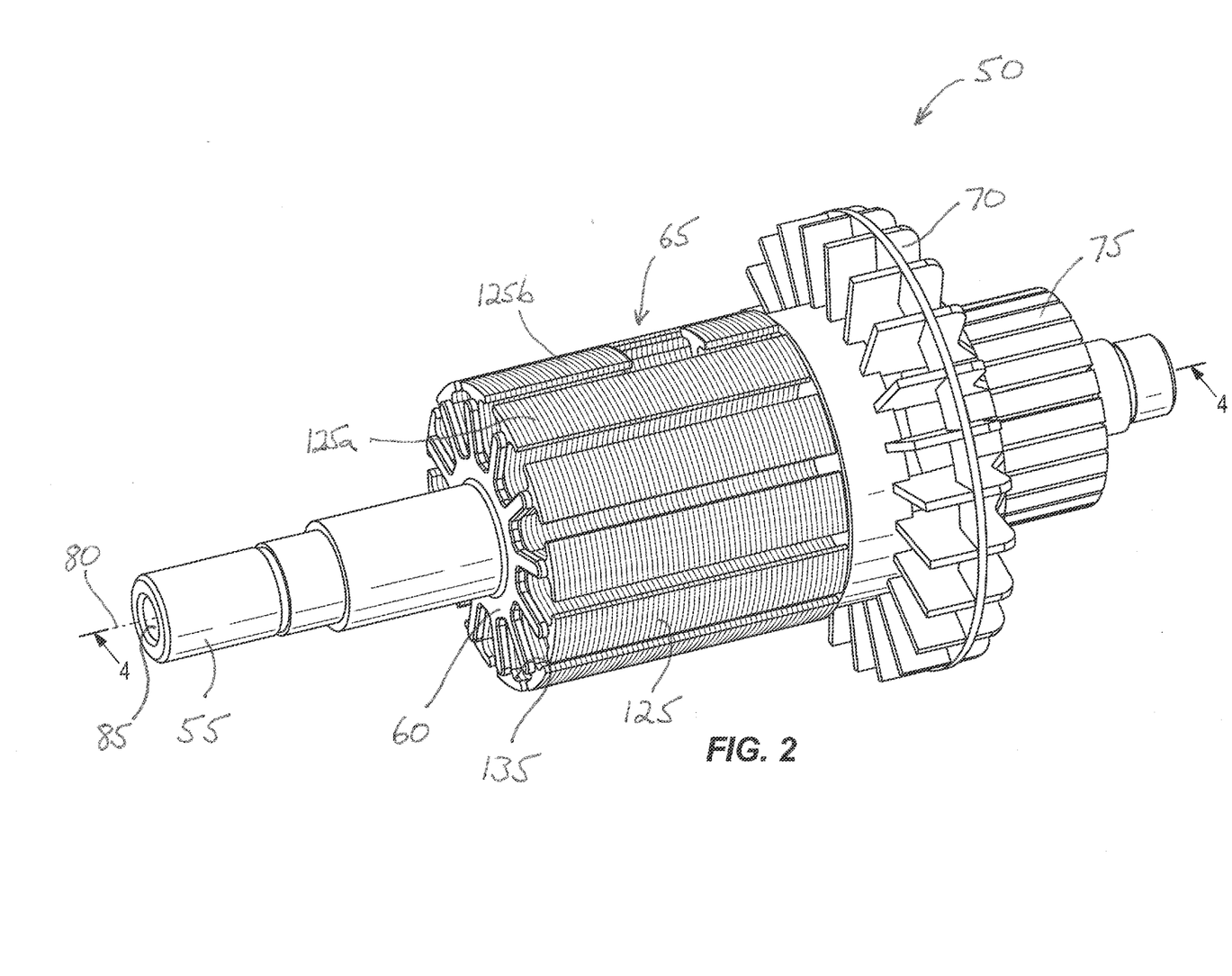
FIG. 2 is a perspective view of a rotating assembly for an electric motor having a rotor core embodying the invention.

FIG. 2 illustrates a rotor 50 suitable for use with the stator 15 of FIG. 1 or preferably with another stator as will be described with respect to FIGS. 10-12. The rotor 50 includes a shaft 55, a pair of clamps 60 (one shown), a magnetic core 65, a fan 70, and a commutator 75. The fan 70 is fixedly coupled to the shaft 55 adjacent the magnetic core 65 so that the fan 70 rotates with the shaft 55 and provides cooling air to the electric motor. In other motors, other types of fans or other fan arrangements may be employed. In some motors, the fan may be omitted entirely. The commutator 75 is fixedly coupled to the shaft 55 to periodically reverse the direction of the current in the rotor windings 40.

Figure 3:
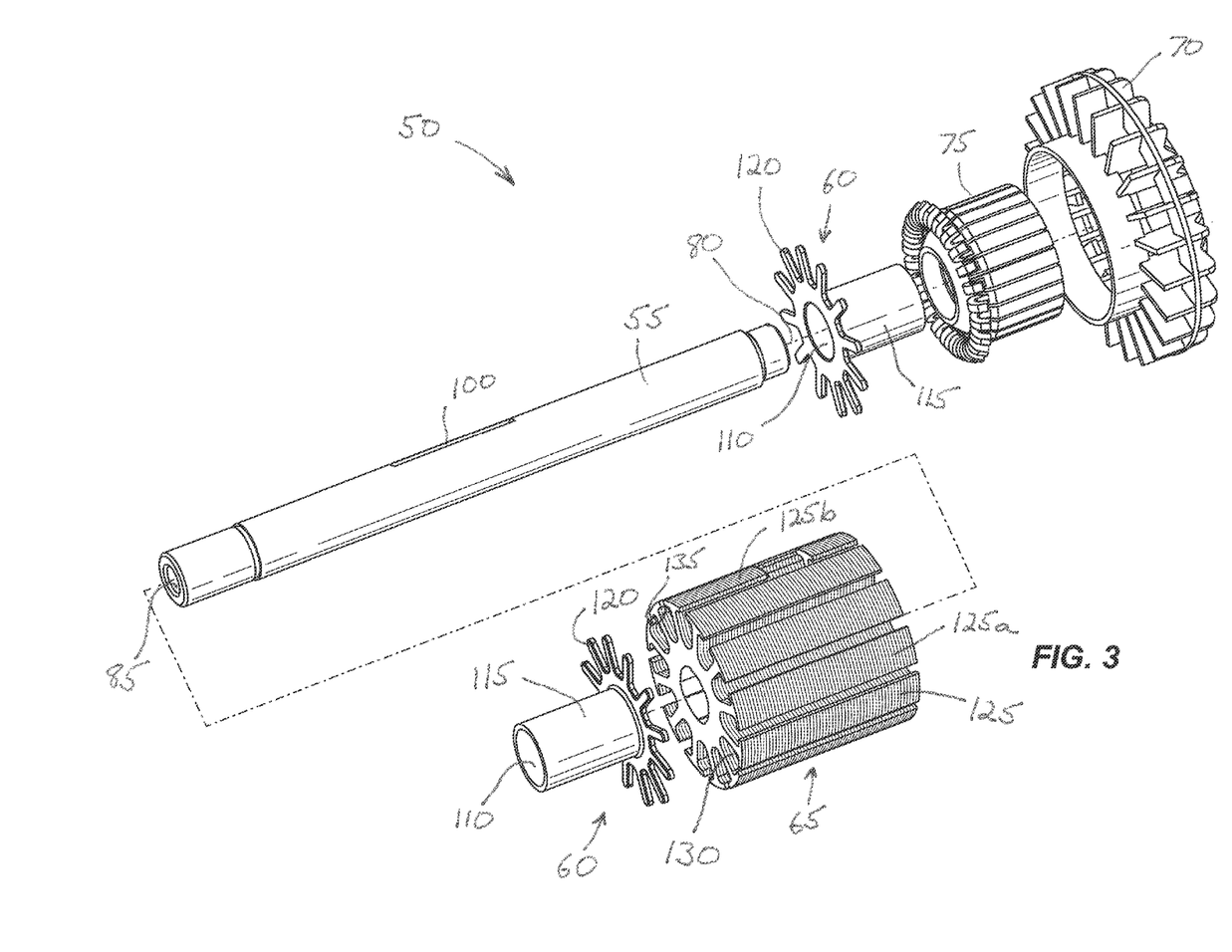
FIG. 3 is an exploded view of the rotating assembly of FIG. 2.

The shaft 55, best illustrated in FIG. 3, is an elongated substantially cylindrical member that provides rotational support to the rotating components of the motor. In the illustrated construction, the shaft 55 extends along a longitudinal or rotational axis 80 and includes a first end and a second end. A central aperture 85 extends through at least a portion of the length of the shaft 55 and defines an axial portion 90 of a cooling flow path 95 as will be discussed in detail with regard to FIG. 4. Two radial slots 100 (one on each side) are defined on an external surface of the shaft 55 and defines a portion of a radial portion 105 of the cooling flow path 95. The illustrated embodiment shows a single slot 100 on each side of the shaft 55 (see FIG. 4), but multiple smaller apertures could be employed in place of each slot 100 if desired.

Referring to FIGS. 2 and 3, each of the clamps 60 includes a central bore 110 sized to engage the shaft 55. Preferably, a shrink fit is provided to fixedly attach the clamps 60 to the shaft 55. Other constructions may use an adhesive, welding, soldering, brazing or another means of attachment. Each of the clamps 60 includes a central hub portion 115 and a plurality of fingers 120 that extend radially outward from an end portion of each of the central hub portions 115. The fingers 120 have a length and define slots therebetween. The central hub portions 115 and the plurality of fingers 120 have a sufficient rigidity and strength to clamp the magnetic core 65 and inhibit unwanted axial movement.

As shown in FIG. 2, the magnetic core 65 is a substantially cylindrical member that is rotationally supported by the shaft 55. The magnetic core 65 of FIG. 2 includes twelve teeth 125 with a portion of the teeth 125 being complete teeth 125a and the remainder of the teeth 125 being incomplete teeth 125b. Each tooth 125 cooperates with an adjacent tooth 125 to define a slot 130. Each tooth 125 includes two hook surfaces 135 with each of the hook surfaces 135 extending into one of two adjacent slots 130. Windings 40 are coupled to a portion of the teeth 125 and are each disposed in at least two of the slots 130 as shown in FIG. 1. Before proceeding, it should be noted that the constructions illustrated herein include twelve teeth 125 that define twelve slots 130 and therefore twelve poles. However, motors having more or fewer teeth 125 can also utilize the invention described herein. As such, the invention should not be limited to twelve pole rotors.

Figure 13:
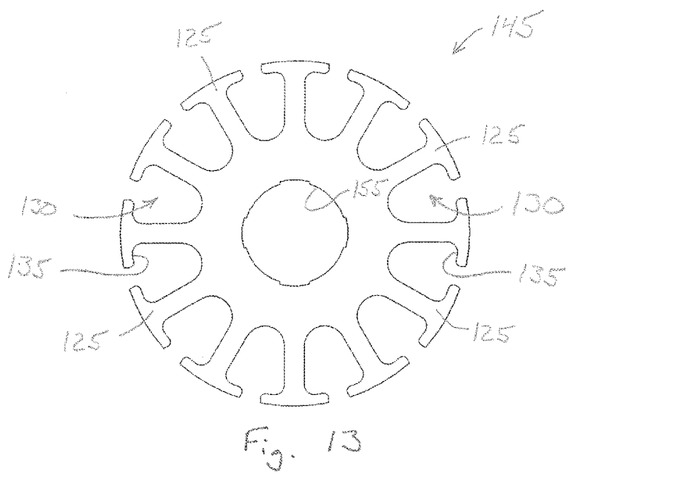
FIG. 13 is an end view of a first or complete lamination.
Figure 14:
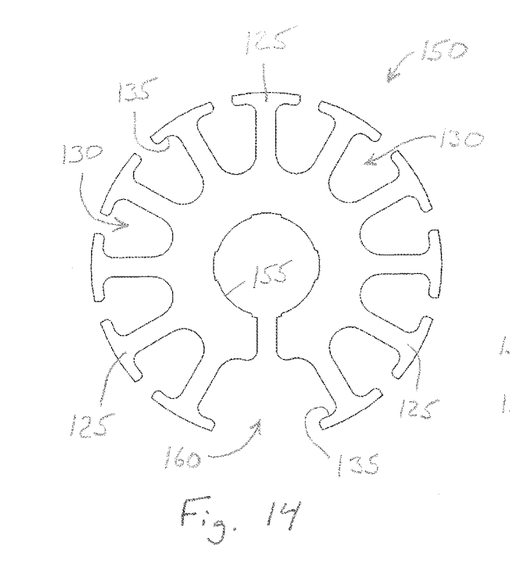
FIG. 14 is an end view of a second or partial lamination.
Figure 15:
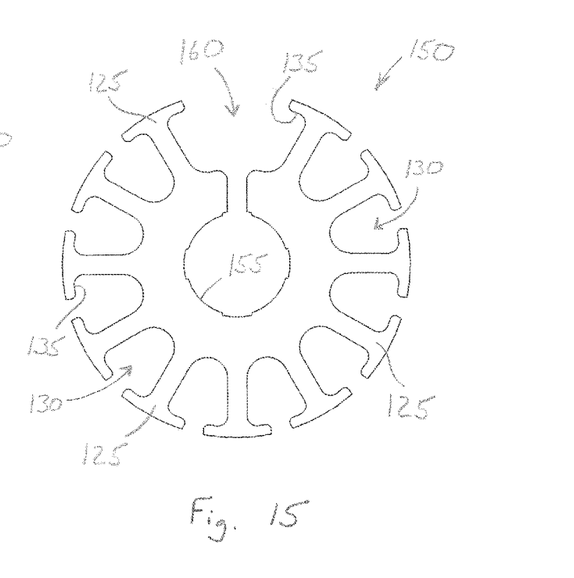
FIG. 15 is an end view of the second lamination rotated 180 degrees with respect to the lamination of FIG. 14.

The magnetic core 65 of FIG. 2 is formed from a plurality of laminations that are stacked along the rotational axis 80 to define a core length 140. In the illustrated construction two different laminations 145, 150 are stacked in three different portions to complete the magnetic core 65. The first lamination 145, illustrated in FIG. 13 includes twelve teeth 125 and extends completely around a central bore 155. The second lamination 150, shown in FIGS. 14 and 15 includes eleven teeth 125 with a slot 160 formed in place of the twelfth tooth and extending from the central bore 155 to the outermost portion of the lamination 150. A first magnetic core portion 165 is formed by stacking a plurality of the first laminations 145 along a first portion 170 of the core length 140. Thus, the first magnetic core portion 165 includes twelve complete teeth 125a.

Figure 4:
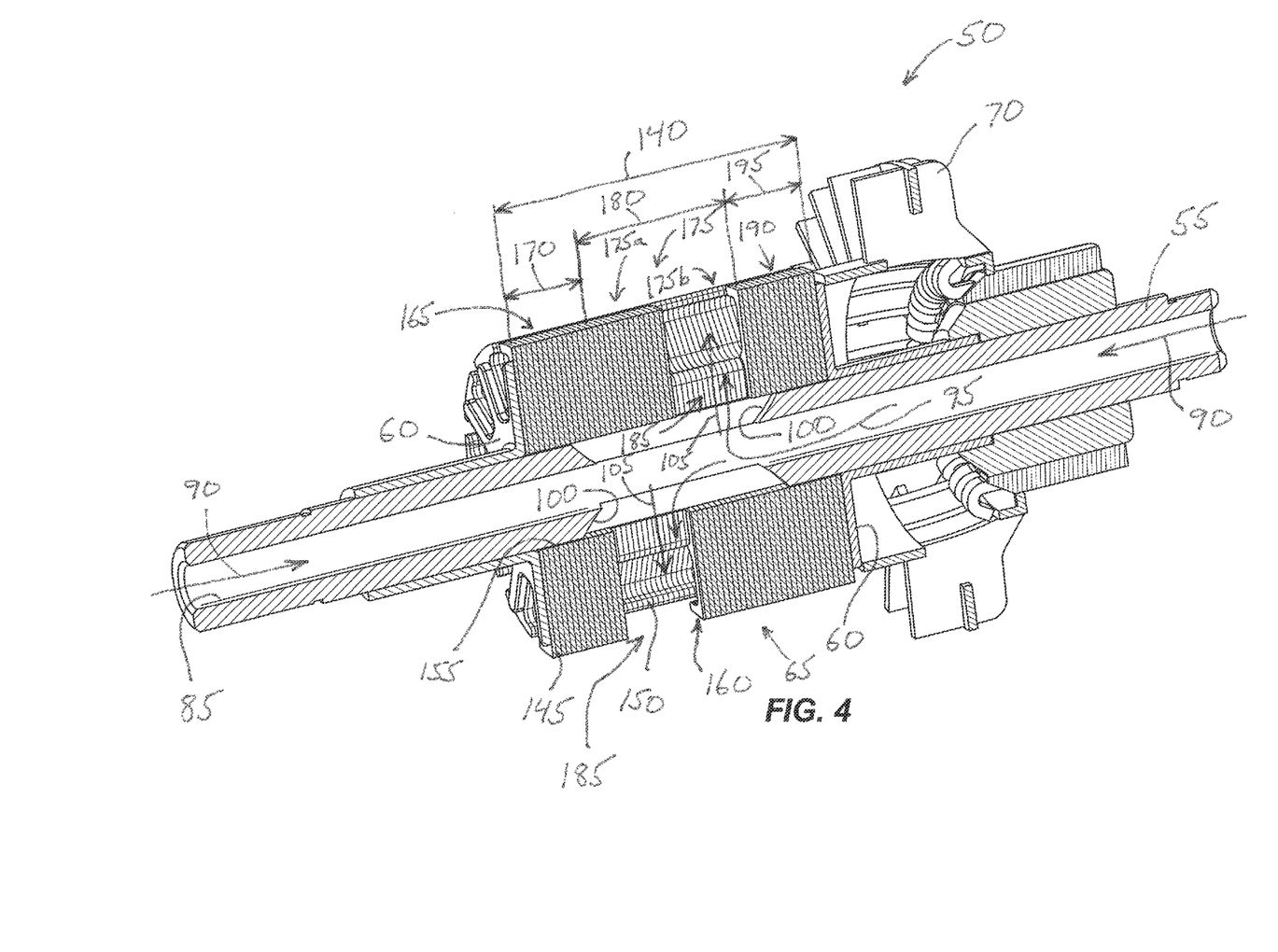
FIG. 4 is a perspective cross section of the rotating assembly of FIG. 2 taken along the rotational axis.
Figure 16:
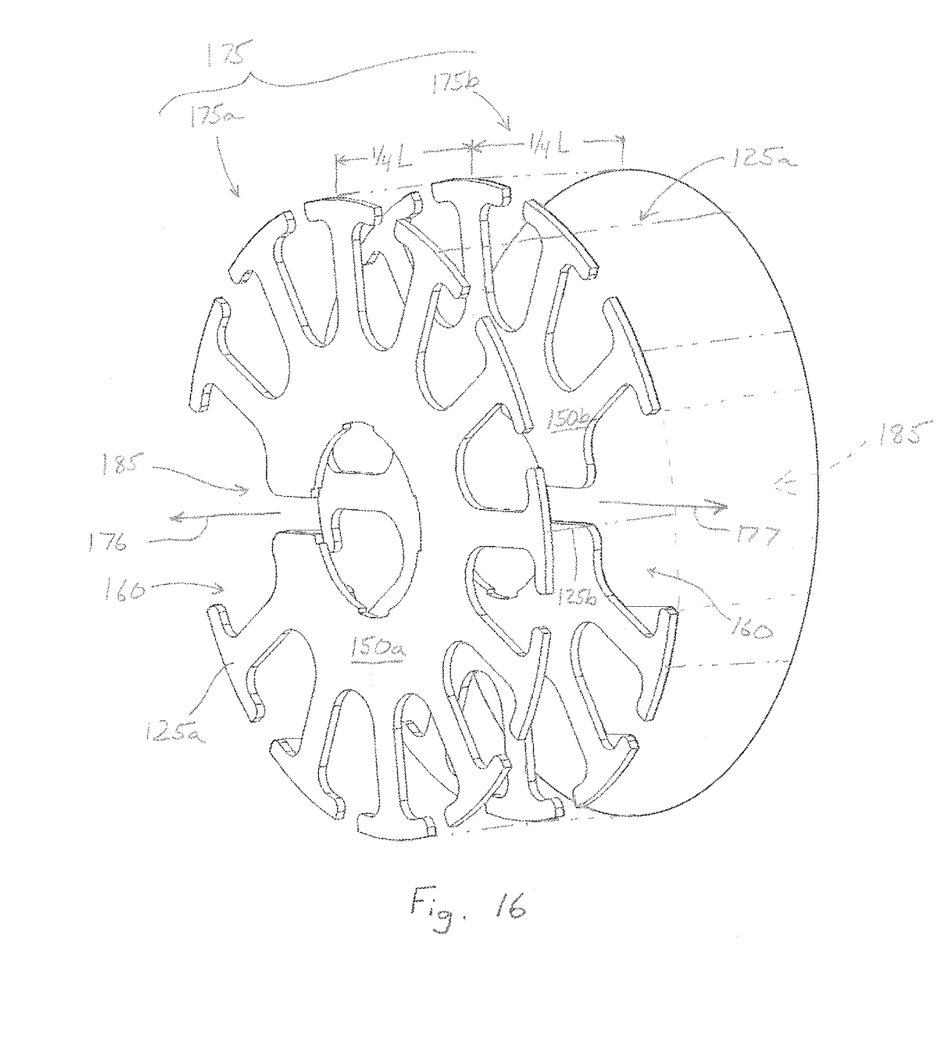
FIG. 16 is a perspective view of a second core portion made up of two sections of the second lamination of FIGS. 14 and 15 aligned to define two gaps.

A second magnetic core portion 175 is formed by stacking the second laminations 150 along the rotational axis 80 for a second portion 180 of the core length 140. As is best illustrated in FIG. 4, the second laminations 150 are stacked in two groups 175a, 175b with the slots 160 of each group aligned with one another. As is best illustrated in FIG. 16, the two groups 175a, 175b are stacked adjacent one another with the slots 160 positioned 180 degrees apart such that the slots 160 define two gaps 185 that are 180 degrees apart. FIG. 16 illustrates the first lamination 150a of the first group 175a having a slot facing in a first direction 176 and the first lamination 150b of the second group 175b having a slot facing in a second direction 177 opposite the first direction 176. Multiple laminations 150a are stacked such that they are aligned with the slot in the first direction 176 to complete the first group 175a and multiple laminations 150b are stacked such that they are aligned with the slot in the second direction 177 to complete the second group 175b. The second magnetic core portion 175 thus includes ten complete teeth 125a and two gaps 185. Of course, other constructions may include fewer or more gaps 185 as may be required to achieve the desired level of cooling or operation.

A third magnetic core portion 190 is formed by stacking a plurality of the first laminations 145 along a third portion 195 of the core length 140. The third magnetic core portion 190 includes twelve complete teeth 125a.

The first portion of the core length 170, the second portion of the core length 180, and the third portion of the core length 195, when totaled, are equal to the total core length 140. In one construction, the completed magnetic core has a length "L" and includes for example, a first magnetic core portion 165 having an axial length "¼L", a second magnetic core portion 175 including a first group 175a having a length "¼L" and a second group 175b having a length "¼L", and a third magnetic core portion 190 having a length "¼L". The twelve teeth 125a of the first magnetic core portion 165 cooperate with the ten complete teeth 125a of the second core portion 175 and with the twelve complete teeth 125a of the third core portion 190 to define ten complete teeth 125a that extend the full length of the magnetic core 65. The two gaps 185 are positioned between the teeth 125a of the first core portion 165 and the third core portion 190 such that two partial-length teeth 125b are formed. Each of the partial teeth 125b includes a first tooth portion at one end of the magnetic core 65, a second tooth portion at the opposite end of the magnetic core 65, and the gap 185 between the first tooth portion and the second tooth portion.

As is best illustrated in FIG. 4, the cooling flow path 95 includes the axial portion 90 that extends through the entire length of the interior 85 of the shaft 55. The cooling flow path 95 also includes the radial slots 100 of the shaft 55 and the gaps 185 which cooperate to define the complete radial portion 105 of the flow path 95. During operation, cooling air enters the shaft 55 at one or both ends and flows along the axial portion 90 of the cooling flow path 95. The air reaches the radial slots 100 of the shaft 55 and flows outward through the radial slots 100 and the gaps 185. As the air flows through the gaps 185 it flows past the windings 40 disposed within the slots 130 adjacent the gaps 185 and cools the windings 40.

In another construction, shown in FIGS. 5-9, a magnetic core 200 has a core length 205 and includes a first rotor magnetic core portion 210 and a second rotor magnetic core portion 215. The first rotor magnetic core portion 210 includes a plurality of laminations 220 stacked contiguously on a shaft 225. Each of the laminations 220 includes twelve teeth 230 such that the laminations 220 cooperate to define twelve complete teeth 230a that extend axially for a portion of the core length 205. Each of the plurality of teeth 230 cooperates with an adjacent tooth 230 to define a slot 235. Four apertures 240 are formed in each of the laminations 220 to define a first attachment portion 245.

Figure 7:
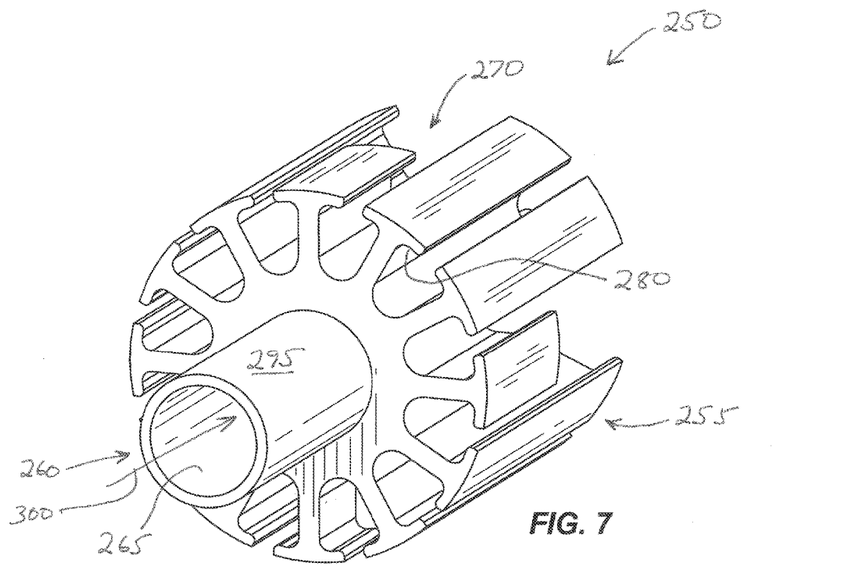
FIG. 7 is a perspective view of a one-piece magnetic component of the rotor of FIG. 5.

Referring to FIG. 7, the second rotor magnetic core portion 215 includes a one-piece magnetic component 250 having a core portion 255 and a support portion 260. In the illustrated embodiment, the one-piece magnetic component 250 is made of a soft magnetic composite (SMC) material. A central aperture 265 is defined through the one-piece magnetic component 250 and extends between a first end and a second end of the magnetic component 250.

The core portion 255 of the magnetic component 250 includes a length that together with the portion of the core length defined by the first core portion 210 extends the full magnetic core length 205. The core portion 255 includes twelve teeth 230 with eight of the teeth 230a extending the full length of the core portion 255 and four teeth 230b extending only a portion of the length to define a radial gap 270. Each radial gap 270 extends through the magnetic component 250 to the central aperture 265 to define a radial flow path 275 through the magnetic component 250. Like the laminations 220, each tooth 230 cooperates with an adjacent tooth 230 to define a slot 235. In addition, each tooth 230 includes two hooks 280 with each hook 280 disposed in one of the slots 235. While the magnetic core 200, including the laminations 220 and the magnetic component 250, has been described as including twelve teeth 230, other constructions may include fewer or more teeth 230 as may be required for the motor. In addition, the magnetic component 250 has been described as including four gaps 270. However, more or fewer gaps 270 could be employed as may be required to achieve the desired cooling.

Figure 8:
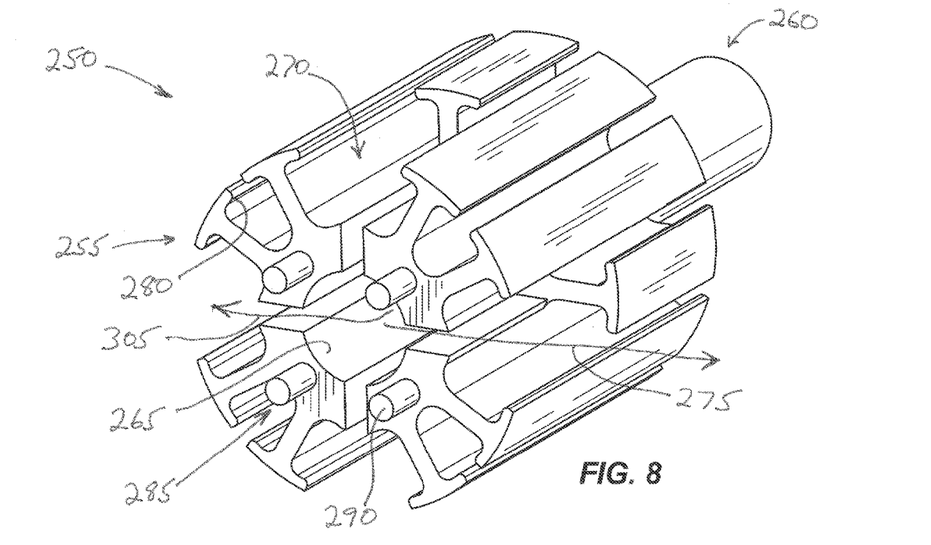
FIG. 8 is another perspective view of the one-piece magnetic component of the rotor of FIG. 5.

With reference to FIG. 8, the magnetic component 250 includes a second attachment portion 285 that includes four pins 290 that extend along axes parallel to the rotational axis 80 of the rotor. Each of the pins 290 is sized to engage one of the apertures 240 of the first attachment portion 245 to couple the first core portion 210 to the second core portion 215 for rotation. As one of ordinary skill will realize, other attachment arrangements could be employed to couple the first core portion 210 and the second core portion 215 for rotation. For example, in some constructions, the pins 290 can be replaced with through bores that receive through bolts. The use of through bolts provides added rigidity in applications that may be subjected to significant bending.

With the first core portion 210 and the second core portion 215 coupled, the teeth 230 are aligned such that they cooperate to define eight teeth 230a that extend the full length 205 of the magnetic core 200 and four teeth 230b that extend only partially along the length 205 of the magnetic core 200. Specifically, the partial-length teeth 230b include a first tooth portion adjacent one end of the magnetic core 200, a second tooth portion adjacent the opposite end of the core 200, and the gap 270 therebetween.

The support portion 260, best illustrated in FIG. 7, includes a shaft or tube 295 that defines the central opening 265 that extends along the rotational axis 80 through the magnetic component 250. The opening 265 defines an axial portion 300 of a cooling flow path 305 as will be discussed in detail. While the illustrated construction includes the support portion 260 formed as one piece with the core portion 255, other constructions could form these components as two separate pieces and then fixedly attach them to one another.

Figure 5:
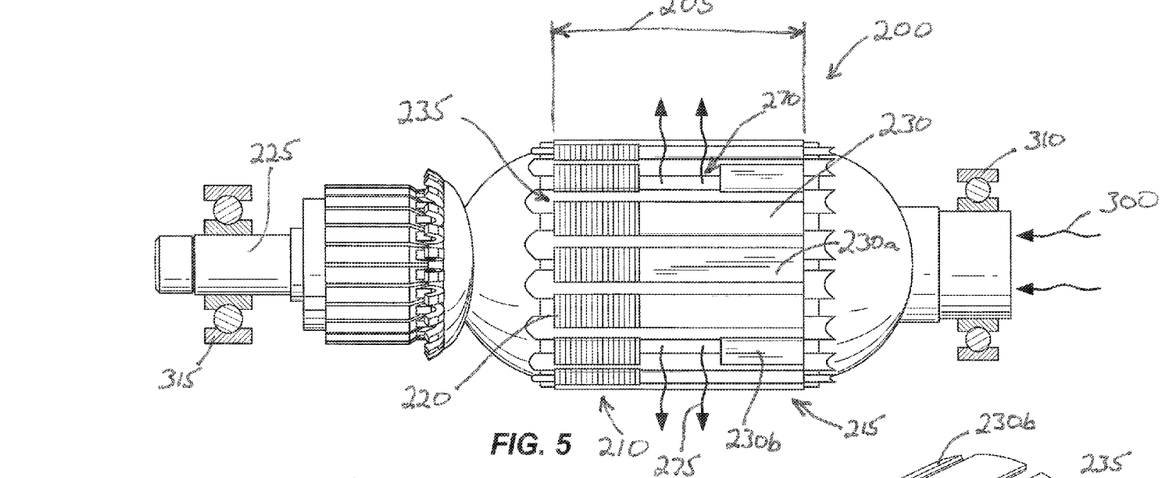
FIG. 5 is a side view of another rotor embodying the invention.
Figure 6:
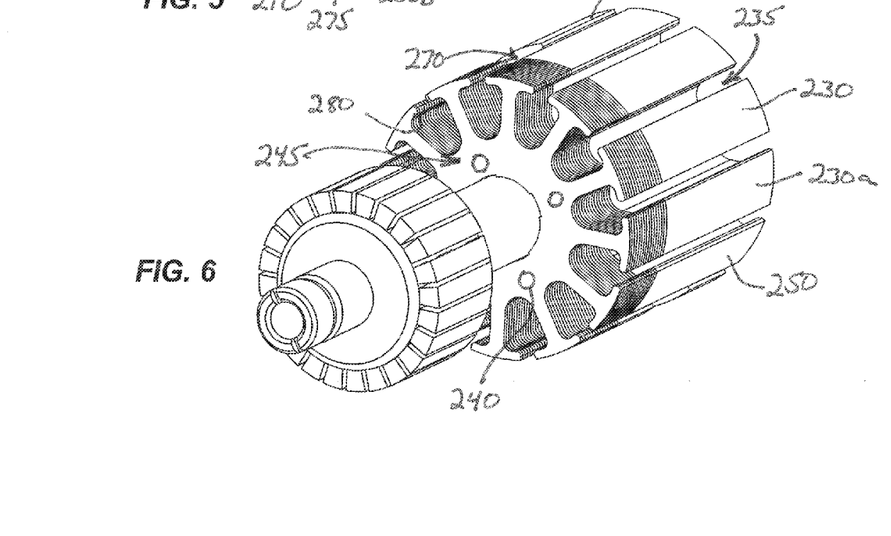
FIG. 6 is a perspective view of a portion of the rotor of FIG. 5.
Figure 9:
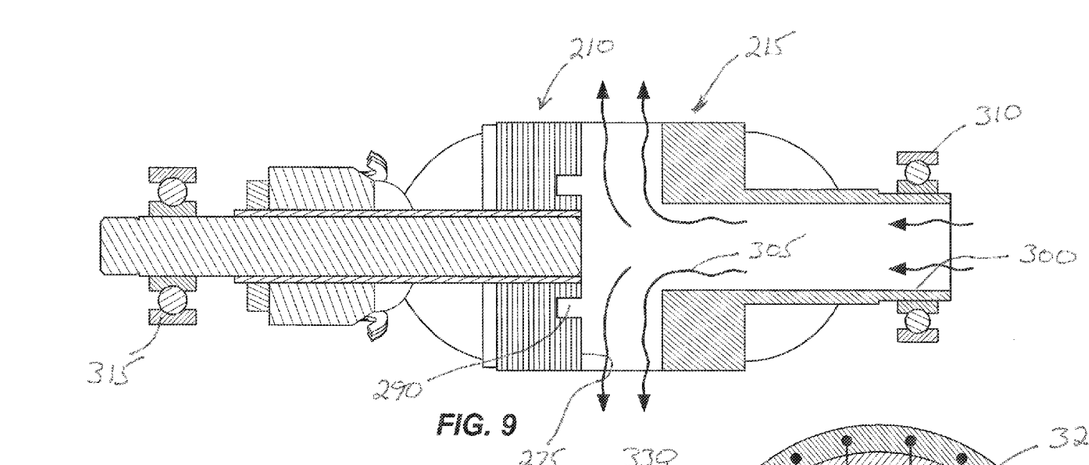
FIG. 9 is a section view of the rotor of FIG. 5 taken along the rotational axis of the rotor.

A first bearing 310 is coupled to the support portion 260 as shown in FIGS. 5 and 9. The first bearing 310 cooperates with a second bearing 315 to fully support the rotor for rotation.

FIGS. 5 and 9 best illustrate the cooling flow path 305 of the construction of FIGS. 5-9. The cooling air enters the cooling flow path 305 via the opening 265 of the support portion 260 and flows axially along the rotational axis 80. Upon reaching the gaps 270 in the magnetic component 250, the cooling air is directed radially outward. As the air flows through the gaps 270, it flows over the windings 40 positioned in the slots 235 adjacent the gaps 270, thereby cooling the windings 40.

To assemble the magnetic core 65 of FIGS. 2-4, the laminations 145, 150 are stacked as described to define the first core portion 165, the second core portion 175 (including one or more gaps 185), and the third core portion 190. In preferred constructions, the laminations 145, 150 include a slight interference fit with the shaft 55 with other means of coupling the laminations 145, 150 and the shaft 55 for rotation. The first end clamp 60 and the second end clamp 60 are fixedly coupled to the shaft 55 and cooperate to axially retain the laminations 145, 150. The windings 40 are then placed in the slots 130 in a conventional manner to complete the magnetic core 65.

The assembly of the magnetic core 200 of FIGS. 5-9 is similar to that for FIGS. 2-3. The first rotor magnetic core portion 210 is first assembled by stacking the laminations 220 in a manner similar to that described with regard to FIGS. 2-4. The second magnetic core portion 215 is then coupled to the first rotor magnetic portion 210. The first engagement portion 245 and the second engagement portion 285 engage one another to inhibit relative rotation between the first rotor magnetic core portion 210 and the second rotor magnetic core portion 215. In the illustrated construction, the four pins 290 of the second magnetic core portion 215 engage the four apertures 240 of the first magnetic core portion 215. The windings 40 are then placed in the slots 235 in a conventional manner to complete the magnetic core 200.

Figure 10:
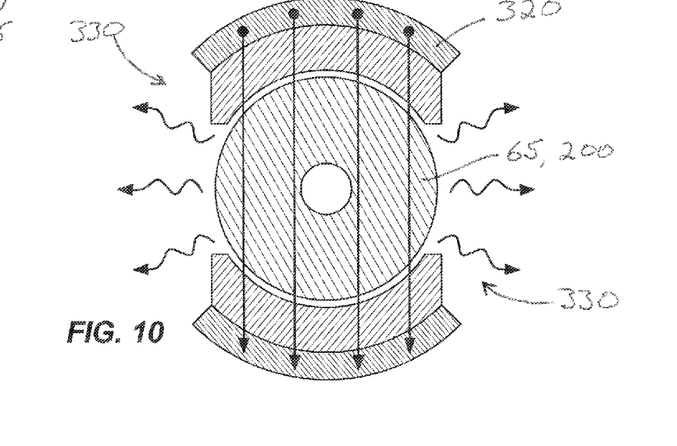
FIG. 10 is a schematic illustration of a motor including an open flux ring for use with the rotor of FIG. 2 or FIG. 5.
Figure 11:
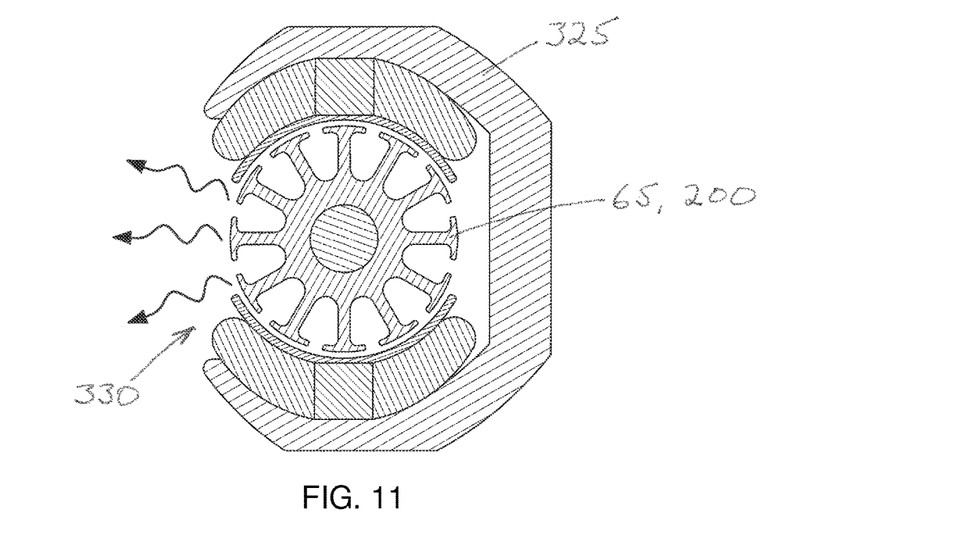
FIG. 11 is a schematic illustration of another motor including an open flux ring for use with the rotor of FIG. 2 or FIG. 5.
Figure 12:
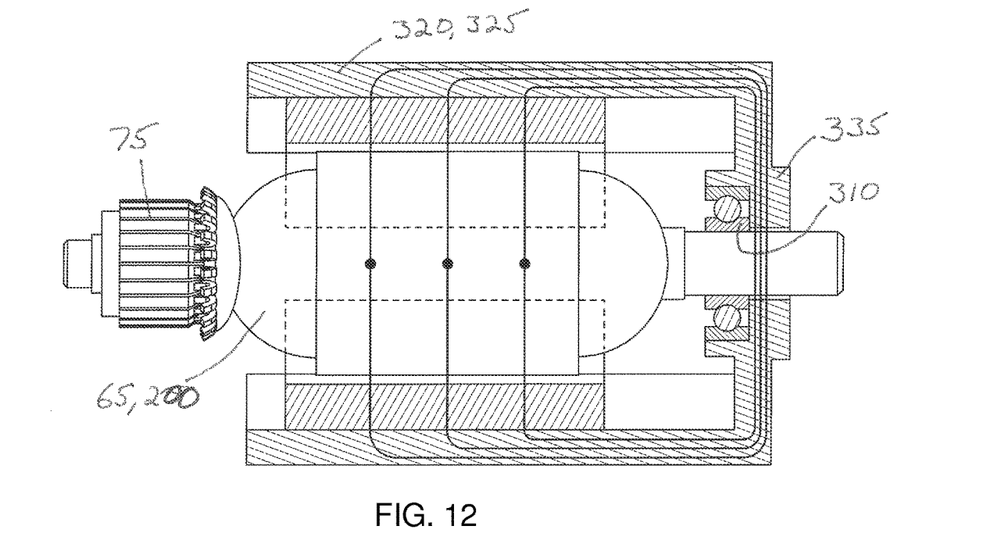
FIG. 12 is a schematic illustration of an axial field return path for use with the motor of FIG. 10 or FIG. 11.

It is also possible to enhance the cooling effect achieved with the magnetic core 65, 200 of FIGS. 2-9 by modifying a stator 320, 325 as illustrated in FIGS. 10 and 11. Specifically, a portion 330 (FIG. 11) or portions 330 (FIG. 10) of the side of the flux rings are removed to provide a freer air flow path through the magnetic cores 65, 200 and the stator 320, 325. As one of ordinary skill will realize, the magnetic flux of the stator 320, 325 typically flows between poles in a fixed axial plane (i.e., a radial return path). In other words, the magnetic flux does not generally extend or deviate in the axial direction but rather remains radial. However, to accommodate the removed portion 330 or portions 330 of the flux ring, a magnetic end ring 335 or flux ring is used to support one of the bearings 310 as illustrated in FIG. 12. The magnetic end ring 335 provides a magnetic path for the magnetic flux, thereby completing the magnetic circuit of the stator 320, 325. The stator 320 of FIG. 10 is best suited for permanent magnet fields while the stator 325 of FIG. 11 is more appropriate for a wound field.

The rotor constructions illustrated herein or the rotor constructions in combination with the stator constructions provide for more efficient cooling of the motor during operation. The enhanced cooling can increase the life of the motor and can improve the durability of the insulating materials used to construct the motor. In addition, the enhanced cooling can allow for greater current density without overheating the rotor or stator components. The ability to carry additional current allows for a higher amp rating for a motor of a given construction (i.e., wire type and diameter, number of windings per coil, etc.) which in turn provides additional torque output for the motor. In some constructions, tests show that an improvement of 50 percent is possible.

Various features and advantages of the invention are set forth in the following claims.

What is claimed is:

1. An electric motor comprising:
   a stator operable to produce a magnetic field, the stator defining an opening; and
   a rotor at least partially disposed within the opening, the rotor comprising,
   a shaft extending along a rotational axis;
   a first rotor magnetic core portion including a first plurality of laminations stacked contiguously on the shaft, each lamination including a predetermined number of teeth;
   a second rotor magnetic core portion coupled to the first rotor magnetic core portion, the second rotor magnetic core portion including a second plurality of laminations, each of the second plurality of laminations including at least one less than the predetermined number of teeth and a slot that extends radially through the lamination, the first rotor magnetic core portion and the second rotor magnetic core portion cooperating to define at least a portion of a rotor magnetic core;
   wherein each of the second plurality of laminations includes a central aperture for the shaft and an exterior and wherein the slot extends from the central aperture to the exterior surface to define a continuous passage radially through the lamination;
   a plurality of windings coupled to the rotor magnetic core; and
   an air flow path formed as part of the second rotor magnetic core portion, the airflow path including an axial portion that passes through the shaft axially along the rotational axis and a radial portion formed by the slots that extends radially outward through the second rotor magnetic core portion.

2. The electric motor of claim 1, wherein the axial portion of the air flow path extends from both a first end and a second end of the shaft along the rotational axis, and wherein the shaft includes a radial aperture operable to connect the axial portion and the radial portion of the air flow path.

3. The electric motor of claim 1, wherein the slot of each lamination of the second plurality of laminations defines a break in the second laminations such that the second laminations do not extend completely around the shaft, and wherein each of the first plurality of laminations completely surround the shaft.

4. The electric motor of claim 3, wherein the second plurality of laminations are stacked such that a portion of the slots are aligned at a first radial position to define a first radial gap, and the remainder of the second plurality of laminations are stacked with the slots aligned at a different radial position to define a second radial gap.

5. The electric motor of claim 4, wherein the first radial gap and the second radial gap are 180 degrees apart.

6. An electric motor comprising:
   a shaft extending along a rotational axis and having a first end and a second end;
   a first plurality of laminations coupled to the shaft and stacked along the rotational axis, each of the first plurality of laminations having a first cross-section including a first number of lamination teeth;
   a second plurality of laminations coupled to the shaft and stacked along the rotational axis immediately adjacent the first plurality of laminations, each of the second plurality of laminations having a second cross-section different from the first cross-section, the second cross section having one less than the first number of lamination teeth and a slot extending radially through the lamination;
   wherein each of the second plurality of laminations includes a central aperture for the shaft and an exterior and wherein the slot extends from the central aperture to the exterior surface to define a continuous passage radially through the lamination;
   a third plurality of laminations coupled to the shaft and stacked along the rotational axis immediately adjacent the second plurality of laminations such that the second plurality of laminations are disposed between the first plurality of laminations and the third plurality of laminations, each of the third plurality of laminations having a third cross-section that is substantially the same as the first cross-section;
   a plurality of teeth defined by the cooperation of the first plurality of laminations, the second plurality of laminations, and the third plurality of laminations, each tooth cooperating with an adjacent tooth to define a winding slot;
   a plurality of windings each coupled to at least one of the teeth and disposed in at least two of the winding slots; and
   an air flow path including an axial portion that extends along the rotational axis, and a radial portion that extends radially through a gap defined by the slots in the second plurality of laminations by the omission of one of the teeth, the air flow path operable to direct a flow of air through at least a portion of the plurality of windings.

7. The electric motor of claim 6, wherein the axial portion of the air flow path extends from both the first end and the second end of the shaft along the rotational axis, and wherein the shaft includes a radial aperture operable to connect the axial portion and the radial portion of the air flow path.

8. The electric motor of claim 6, wherein the first cross section and the third cross section extend completely around the rotational axis and include portions of a first quantity of teeth, and wherein the second cross section includes the slot such that the laminations having the second cross-section include portions of a second quantity of teeth that is at least one less than the first quantity of teeth.

9. The electric motor of claim 8, wherein the gap includes a first radial gap and a second radial gap and wherein the second plurality of laminations are stacked such that a portion of the slots are aligned at a first radial position to define the first radial gap, and the remainder of the second plurality of laminations are stacked with the slots aligned at a different radial position to define the second radial gap.

10. The electric motor of claim 9, wherein the first radial gap and the second radial gap are 180 degrees apart.

11. The electric motor of claim 6, wherein the plurality of teeth includes a plurality of complete teeth that extend the full length of the stack of the first plurality of laminations, the second plurality of laminations, and the third plurality of laminations, and a plurality of partial teeth that each include a first tooth piece, a second tooth piece, and the gap therebetween.

12. The electric motor of claim 6, further comprising a first end clamp fixedly coupled to the shaft and a second end clamp fixedly coupled to the shaft, the first end clamp and the second end clamp cooperating to retain the laminations therebetween.

13. The electric motor of claim 1, wherein each of the teeth of the first laminations and each of the teeth of the second laminations are spaced 360 degrees divided by the predetermined number of teeth from at least one adjacent tooth such that the second laminations define a gap and wherein the radial portion extends through the gap.

\* \* \* \* \*